(12) United States Patent
Tang (10) Patent No.: US 11,496,248 B2
(45) Date of Patent: Nov. 8, 2022

(54) METHOD AND APPARATUS FOR TRANSMITTING HARQ INFORMATION, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 60 days.

(21) Appl. No.: 16/969,316

(22) PCT Filed: Feb. 13, 2018

(86) PCT No.: PCT/CN2018/076679
§ 371 (c)(1),
(2) Date: Aug. 12, 2020

(87) PCT Pub. No.: WO2019/157639
PCT Pub. Date: Aug. 22, 2019

(65) Prior Publication Data
US 2021/0050949 A1   Feb. 18, 2021

(51) Int. Cl.
*H04W 72/04* (2009.01)
*H04L 1/18* (2006.01)

(52) U.S. Cl.
CPC ......... *H04L 1/1812* (2013.01); *H04W 72/042* (2013.01); *H04W 72/0413* (2013.01)

(58) Field of Classification Search
CPC ... H04L 1/1812; H04L 1/1854; H04L 5/0055; H04L 5/1469; H04W 72/0413; H04W 72/042; H04W 72/0446
(Continued)

(56) References Cited

U.S. PATENT DOCUMENTS

2015/0043391 A1   2/2015  Yin et al.
2017/0310447 A1*  10/2017 Kusashima ....... H04W 72/0406
(Continued)

FOREIGN PATENT DOCUMENTS

CN    106658742    5/2017
CN    107027180    8/2017
(Continued)

OTHER PUBLICATIONS

WIPO, ISR for PCT/CN2018/076679, Sep. 27, 2018.
(Continued)

*Primary Examiner* — Robert J Lopata
(74) *Attorney, Agent, or Firm* — Hodgson Russ LLP (57) ABSTRACT

Disclosed are a method and apparatus for transmitting HARQ information, and a computer storage medium. The method includes: a terminal device determines first HARQ information that is HARQ information corresponding to a first downlink data channel and received by the terminal device on a first downlink time unit, the first downlink data channel corresponding to a first time sequence value, and the first downlink time unit being a time unit in a first downlink transmission opportunity; and the terminal device transmits first uplink control information including the first HARQ information on a first uplink time unit, the first uplink time unit being a time unit in a first uplink transmission opportunity that is later than the first downlink transmission opportunity, and a time distance between the first uplink time unit and the first downlink time unit being greater than or equal to the first time sequence value.

17 Claims, 4 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0074935 A1* | 3/2019 | Babaei | ................. | H04L 1/1812 |
| 2019/0103947 A1* | 4/2019 | Park | ...................... | H04L 1/1896 |
| 2019/0174515 A1* | 6/2019 | Li | ..................... | H04W 72/1263 |
| 2019/0174523 A1* | 6/2019 | Wang | ................... | H04L 5/0055 |
| 2019/0280825 A1* | 9/2019 | Yeo | ........................ | H04L 1/1861 |
| 2019/0363842 A1* | 11/2019 | Fu | ..................... | H04W 72/0406 |
| 2020/0170043 A1* | 5/2020 | Fu | ....................... | H04W 74/004 |
| 2020/0228230 A1* | 7/2020 | Mukherjee | ............ | H04L 1/1893 |
| 2020/0229231 A1* | 7/2020 | Oh | ........................ | H04W 16/14 |
| 2020/0374049 A1* | 11/2020 | Tang | .................... | H04L 5/0055 |

FOREIGN PATENT DOCUMENTS

| | | |
|---|---|---|
| CN | 107040338 | 8/2017 |
| CN | 107113809 | 8/2017 |
| CN | 107295663 | 10/2017 |
| CN | 107347002 | 11/2017 |
| WO | 2017014074 | 1/2017 |
| WO | 2017052345 | 3/2017 |
| WO | 2019028844 | 2/2019 |

OTHER PUBLICATIONS

European Patent Office, Extended Search Report for EP Application No. 18906001.5, dated Feb. 1, 2021.
Huawei et al., "UCI transmission for eLAA", 3GPP TSG RAN WG1 Meeting #85, May 27, 2016.
Huawei et al., "NR frame structure on unlicensed bands," 3GPP TSG RAN WG1 Adhoc Meeting, R1-1800040, Jan. 2018, 7 pages.
CATT, "Discussion on HARQ management and HARQ-ACK feedback," 3GPP TSG RAN WG1 Meeting #91, R1-1720203, Nov. 2017.
Nokia et al., "On the open aspects of HARQ management," 3GPP TSG RAN WG1 NR Ad-Hoc #3, R1-1715546, Sep. 2017.
Nokia et al., "Remaining aspects of HARQ management," 3GPP TSG RAN WG1 Meeting 90bis, R1-1718621, Oct. 2017.
Nokia et al., "On remaining details of HARQ procedure," 3GPP TSG RAN WG1 Meeting 91, R1-1720480, Nov. 2017.
Nokia et al., "On HARQ feedback determination," 3GPP TSG RAN WG1 #90, R1-17104016, Aug. 2017.
Nokia et al., "Timing aspects for HARQ-ACK feedback," 3GPP TSG-RAN WG1#90, R1-1714015, Aug. 2017.
JPO, Office Action for JP Application No. 2020-543154, dated Dec. 24, 2021.
IPI, Office Action for IN Application No. 202027037507, dated Nov. 25, 2021.
EPO, Communication for EP Application No. 18906001.5, dated Mar. 28, 2022.
CNIPA, First Office Action for CN Application No. 202110920877.2, dated Sep. 15, 2022.

* cited by examiner

FIG. 1

A TERMINAL DEVICE DETERMINES FIRST HARQ INFORMATION, THE FIRST HARQ INFORMATION BEING HARQ INFORMATION CORRESPONDING TO A FIRST DOWNLINK DATA CHANNEL AND RECEIVED BY THE TERMINAL DEVICE ON A FIRST DOWNLINK TIME UNIT, THE FIRST DOWNLINK DATA CHANNEL CORRESPONDING TO A FIRST TIME SEQUENCE VALUE, AND THE FIRST DOWNLINK TIME UNIT BEING A TIME UNIT ION A FIRST DOWNLINK TRANSMISSION OPPORTUNITY — 201

THE TERMINAL DEVICE TRANSMITS FIRST UPLINK CONTROL INFORMATION ON A FIRST UPLINK TIME UNIT, THE FIRST UPLINK CONTROL INFORMATION COMPRISING THE FIRST HARQ INFORMATION, THE FIRST UPLINK TIME UNIT BEING A TIME UNIT IN A FIRST UPLINK TRANSMISSION OPPORTUNITY, THE FIRST UPLINK TRANSMISSION OPPORTUNITY BEING LATER THAN THE FIRST DOWNLINK TRANSMISSION OPPORTUNITY, AND A TIME DISTANCE BETWEEN THE FIRST UPLINK TIME UNIT AND THE FIRST DOWNLINK TIME UNIT BEING GREATER THAN OR EQUAL TO THE FIRST TIME SEQUENCE VALUE — 202

FIG. 2

The network device receives first uplink control information sent by the terminal device on a first uplink time unit, where the first uplink control information includes first Hybrid Automatic Repeat reQuest (HARQ) information, where the first HARQ information is HARQ information corresponding to a first downlink data channel received by the terminal device on a first downlink time unit, the first downlink data channel corresponds to a first timing value, the first downlink time unit is a time unit in a first downlink transmission opportunity, the first uplink time unit is a time unit in a first uplink transmission opportunity, the first uplink transmission opportunity is later than the first downlink transmission opportunity, and a time distance between the first uplink time unit and the first downlink time unit is greater than or equal to the first timing value  ⎯ 301

The network device determines the first HARQ information according to the first uplink control information  ⎯ 302

METHOD AND APPARATUS FOR TRANSMITTING HARQ INFORMATION, AND COMPUTER STORAGE MEDIUM

CROSS-REFERENCE TO RELATED APPLICATION

This application is a U.S. national phase application of International Application No. PCT/CN2018/076679, filed Feb. 13, 2018, the entire disclosures of which are incorporated herein by reference.

TECHNICAL FIELD

The present disclosure relates to the field of wireless communication technology, and in particular, to a method and apparatus for transmitting Hybrid Automatic Repeat ReQuest (HARQ) information and a computer storage medium.

BACKGROUND

With the development of wireless communication technology, the Licensed-Assisted Access-Long Term Evolution (LAA-LTE) based on the Long Term Evolution (LTE) system is based on the carrier aggregation structure and provides services to the terminal device by using the carrier on the licensed spectrum as the primary carrier and using the carrier on the unlicensed spectrum as the secondary carrier. When the New Radio (NR) system is applied to the unlicensed spectrum, in addition to supporting the LAA networking, it also supports the Standalone (SA) networking, so the transmission of the Physical Uplink Control Channel (PUCCH) on the unlicensed spectrum needs to be considered.

In the NR system, PUCCH includes multiple formats, and each format of PUCCH includes multiple symbol lengths, as shown in Table 1.

TABLE 1

| PUCCH format | | |
|---|---|---|
| PUCCH format | Number of symbols included in PUCCH | Number of bits carried on PUCCH |
| 0 | 1-2 | ≤2 |
| 1 | 4-14 | ≤2 |
| 2 | 1-2 | >2 |
| 3 | 4-14 | >2 |
| 4 | 4-14 | >2 |

The network device may configure one or more of PUCCH formats 0, 1, 2, 3, and 4 for a terminal device. The configuration information of one PUCCH resource includes at least a position of a starting symbol of the PUCCH and the number of symbols included in the PUCCH. Specifically, for PUCCH formats 0 and 2, the corresponding PUCCH includes 1 or 2 symbols; and for PUCCH formats 1, 3, and 4, the corresponding PUCCH includes any number of symbols from 4 to 14.

Figure 1:
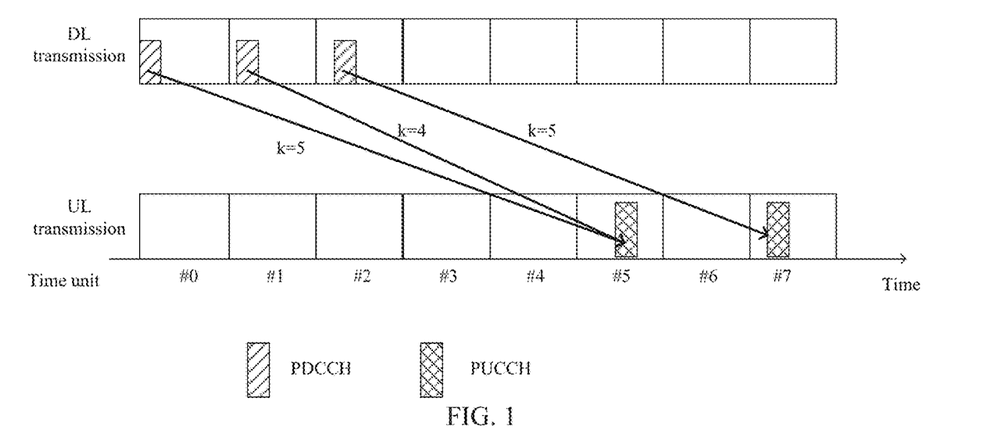
FIG. 1 is a schematic diagram of a time domain of PDSCH-HARQ feedback.

The network device dynamically indicates a time domain position of the PUCCH resource of the terminal device through Downlink Control Information (DCI). For example, it is determined by the network device using PDSCH-HARQ indication information (feedback time indication information of Physical Downlink Shared Channel (PDSCH)-Hybrid Automatic Repeat reQuest (HARQ)). As shown in FIG. 1, it should be understood that DCI is carried in a Physical Downlink Control Channel (PDCCH) shown in FIG. 1. For example, the network device schedules a PDSCH transmission on the time unit #0 through the PDCCH, and the PDCCH indicates that k in the feedback time n+k of the uplink feedback PDSCH-HARQ corresponding to the PDSCH is k=5, and in FIG. 1, it is assumed that PDCCH and PDSCH are on the same time unit. After receiving the PDSCH on the $n^{th}$ time unit, the terminal device feeds back the HARQ information corresponding to the PDSCH on the $(n+5)^{th}$ time unit, that is, PUCCH is transmitted on time unit #5 in FIG. 1, and the PUCCH carries the HARQ information corresponding to PDSCH on time unit #0.

Before sending a signal, the terminal device needs to perform a detection on the channel on the unlicensed spectrum through a Clear Channel Assessment (CCA). When the channel is idle, the PUCCH can be sent, otherwise it cannot be sent. If a fixed PDSCH-HARQ feedback time is used, the PUCCH resources determined according to the PDSCH-HARQ feedback time will be scattered, thereby affecting the uplink scheduling of the network device.

SUMMARY

To solve the above technical problems, the embodiments of the present disclosure provide a method and apparatus for transmitting Hybrid Automatic Repeat reQuest (HARQ) information, and a computer storage medium.

In a first aspect, a method for transmitting HARQ information is provided, including:

determining, by a terminal device, first Hybrid Automatic Repeat reQuest (HARQ) information, wherein the first HARQ information is HARQ information corresponding to a first downlink data channel received by the terminal device on a first downlink time unit, the first downlink data channel corresponds to a first timing value, and the first downlink time unit is a time unit in a first downlink transmission opportunity; and transmitting, by the terminal device, first uplink control information on a first uplink time unit, wherein the first uplink control information comprises the first HARQ information, wherein the first uplink time unit is a time unit in a first uplink transmission opportunity, the first uplink transmission opportunity is later than the first downlink transmission opportunity, and a time distance between the first uplink time unit and the first downlink time unit is greater than or equal to the first timing value.

Alternatively, the first downlink time unit is a time unit in the first downlink transmission opportunity, the first uplink time unit is a time unit in the first uplink transmission opportunity, and the first uplink transmission opportunity is later than the first downlink transmission opportunity.

In an optional implementation manner, the method further includes:

receiving, by the terminal device, first information on a second downlink time unit, wherein the first information is used to determine a second timing value, and the second timing value is a time distance between the first uplink time unit and a reference time unit, wherein the reference time unit and the second downlink time unit are the same time unit; or, the reference time unit is the last downlink time unit in the first downlink transmission opportunity; or, the reference time unit is the first one of the uplink time units in the first uplink transmission opportunity.

In an optional implementation manner, a difference between the first timing value and the second timing value is a first value, and a time distance between the first downlink time unit and the reference time unit is greater than or equal to the first value.

In an optional implementation manner, the first timing value is determined by scheduling first downlink control information transmitted by the first downlink data channel.

In an optional implementation manner, the first uplink control information further includes second HARQ information, wherein the second HARQ information is HARQ information corresponding to a second downlink data channel received by the terminal device on a third downlink time unit, the second downlink data channel corresponds to a third timing value, and the third downlink time unit is a time unit in the first downlink transmission opportunity; and a time distance between the first uplink time unit and the third downlink time unit is greater than or equal to the third timing value.

It should be understood that if it is determined according to the timing values that at least two HARQ information is transmitted on at least two different time units (for example, the first HARQ information is determined to be transmitted on the first time unit according to the first timing value, and the second HARQ information is determined to be transmitted on the second time unit according to the third timing value), the transmission of the at least two HARQ information on the same time unit can make the network device allocate the time unit for transmitting the uplink feedback information in a centralized way, so as to determine the uplink and downlink resource allocation on the unlicensed carrier more flexibly.

In an optional implementation manner, the method further includes:

transmitting, by the terminal device, the first uplink control information on a second uplink time unit, wherein the second uplink time unit is later than the first uplink time unit.

It should be understood that using at least two uplink time units (such as the first uplink time unit and the second uplink time unit) to transmit the first uplink control information can improve the correct transmission probability of the first uplink control information, thus ensuring the performance of the communication link.

In an optional implementation manner, the second uplink time unit is a time unit in the first uplink transmission opportunity; or, the second uplink time unit is a time unit in a second uplink transmission opportunity.

In an optional implementation manner, the method further includes:

determining, by the terminal device, third HARQ information, wherein the third HARQ information is HARQ information corresponding to a third downlink data channel received by the terminal device on a fourth downlink time unit, the third downlink data channel corresponds to a fourth timing value, the fourth downlink time unit is a time unit in the first downlink transmission opportunity, and a time distance between the fourth downlink time unit and the reference time unit is less than the first value; and transmitting, by the terminal device, second uplink control information on a third uplink time unit, wherein the second uplink control information comprises the third HARQ information, and a time distance between the third uplink time unit and the fourth downlink time unit is greater than or equal to the fourth timing value.

In an optional implementation manner, the third uplink time unit is a time unit in the first uplink transmission opportunity; or, the third uplink time unit is a time unit in a third uplink transmission opportunity.

In a second aspect, there is provided a method for transmitting Hybrid Automatic Repeat reQuest (HARQ) information, including:

receiving, by a network device, first uplink control information sent by a terminal device on a first uplink time unit, wherein the first uplink control information comprises first Hybrid Automatic Repeat reQuest (HARQ) information, wherein the first HARQ information is HARQ information corresponding to a first downlink data channel received by the terminal device on a first downlink time unit, wherein the first downlink data channel corresponds to a first timing value, the first downlink time unit is a time unit in a first downlink transmission opportunity, the first uplink time unit is a time unit in a first uplink transmission opportunity, the first uplink transmission opportunity is later than the first downlink transmission opportunity, and a time distance between the first uplink time unit and the first downlink time unit is greater than or equal to the first timing value; and determining, by the network device, the first HARQ information according to the first uplink control information.

Alternatively, the first downlink time unit is a time unit in the first downlink transmission opportunity, the first uplink time unit is a time unit in the first uplink transmission opportunity, and the first uplink transmission opportunity is later than the first downlink transmission opportunity.

In an optional implementation manner, the method further includes:

sending, by the network device, first information on a second downlink time unit, wherein the first information is used by the terminal device to determine a second timing value, and the second timing value is a time distance between the first uplink time unit and a reference time unit, wherein the reference time unit and the second downlink time unit are the same time unit; or, the reference time unit is the last downlink time unit in the first downlink transmission opportunity; or, the reference time unit is the first one of the uplink time unit in the first uplink transmission opportunity.

In an optional implementation manner, a difference between the first timing value and the second timing value is a first value, and a time distance between the first downlink time unit and the reference time unit is greater than or equal to the first value.

In an optional implementation manner, the method further includes:

sending, by the network device, first downlink control information, wherein the first downlink control information is used to schedule the first downlink data channel, and the first downlink control information is also used by the terminal device to determine the first timing value.

In an optional implementation manner, the first uplink control information further includes second HARQ information, wherein the second HARQ information is HARQ information corresponding to a second downlink data channel received by the terminal device on a third downlink time unit, the second downlink data channel corresponds to a third timing value, and the third downlink time unit is a time unit in the first downlink transmission opportunity; and a time distance between the first uplink time unit and the third downlink time unit is greater than or equal to the third timing value; and determining, by the network device, the second HARQ information according to the first uplink control information.

In an optional implementation manner, the method further includes:

receiving, by the network device, the first uplink control information sent by the terminal device on a second uplink time unit, wherein the second uplink time unit is later than the first uplink time unit.

It should be understood that using at least two uplink time units (such as the first uplink time unit and the second uplink time unit) to receive the first uplink control information can improve the correct transmission probability of the first uplink control information, thus ensuring the performance of the communication link.

In an optional implementation manner, the second uplink time unit is a time unit in the first uplink transmission opportunity; or, the second uplink time unit is a time unit in a second uplink transmission opportunity.

In an optional implementation manner, the method further includes:

receiving, by the network device, second uplink control information sent by the terminal device on a third uplink time unit, wherein the second uplink control information comprises third HARQ information, wherein the third HARQ information is HARQ information corresponding to a third downlink data channel received by the terminal device on a fourth downlink time unit, wherein the third downlink data channel corresponds to a fourth timing value, the fourth downlink time unit is a time unit in the first downlink transmission opportunity, a time distance between the fourth downlink time unit and the reference time unit is less than the first value, and a time distance between the third uplink time unit and the fourth downlink time unit is greater than or equal to the fourth timing value; and determining, by the network device, the third HARQ information according to the second uplink control information.

In an optional implementation manner, the third uplink time unit is a time unit in the first uplink transmission opportunity; or, the third uplink time unit is a time unit in a third uplink transmission opportunity.

In a third aspect, an information transmission apparatus is provided for performing the method in the first aspect or any possible implementation manner of the first aspect. Specifically, the apparatus includes a unit for performing the method in the above-mentioned first aspect or any possible implementation manner of the first aspect.

In a fourth aspect, there is provided an information transmission apparatus for performing the method in the second aspect or any possible implementation manner of the second aspect. Specifically, the apparatus includes a unit for performing the method in the second aspect or any possible implementation manner of the second aspect.

In a fifth aspect, a device for transmitting information is provided. The device includes: a memory, a processor, an input interface, and an output interface. The memory, the processor, the input interface and the output interface are connected through a bus system. The memory is configured to store instructions, and the processor is configured to execute the instructions stored in the memory, to perform the method in the above-mentioned first aspect or in any possible implementation manner of the first aspect.

In a sixth aspect, a device for transmitting information is provided. The device includes: a memory, a processor, an input interface, and an output interface. The memory, the processor, the input interface and the output interface are connected through a bus system. The memory is configured to store instructions, and the processor is configured to execute the instructions stored in the memory, to perform the method in the second aspect or in any possible implementation manner of the second aspect.

In a seventh aspect, a computer storage medium is provided for storing computer software instructions for executing the method in the first aspect or any possible implementation manner of the first aspect, which includes program designed to perform the above aspects.

In an eighth aspect, a computer storage medium is provided for storing computer software instructions for performing the method in the second aspect or any possible implementation manner of the second aspect, which includes program designed to perform the above aspects program.

In a ninth aspect, a computer program product including instructions is provided, which when executed on a computer, causes the computer to perform the method in the first aspect or any optional implementation manner of the first aspect.

In a tenth aspect, a computer program product including instructions is provided, which when executed on a computer, causes the computer to perform the method in the second aspect or any optional implementation manner of the second aspect.

In the technical solutions of the embodiments of the present disclosure, the terminal device determines the first Hybrid Automatic Repeat reQuest (HARQ) information, where the first HARQ information is HARQ information corresponding to the first downlink data channel received by the terminal device on the first downlink time unit, the first downlink data channel corresponds to a first timing value, and the first downlink time unit is a time unit in a first downlink transmission opportunity.

The terminal device transmits first uplink control information on a first uplink time unit, where the first uplink control information includes the first HARQ information, where the first uplink time unit is a time unit in the first uplink transmission opportunity, the first uplink transmission opportunity is later than the first downlink transmission opportunity, and the time distance between the first uplink time unit and the first downlink time unit is greater than or equal to the first timing value. Using the technical solutions of the embodiments of the present disclosure, when the uplink control information is fed back on an unlicensed carrier, by flexibly feeding back the HARQ information corresponding to the PDSCH on one or more time units satisfying the PDSCH-HARQ feedback timing on the time unit for transmitting the uplink control information, the network device can flexibly and effectively allocate the uplink and downlink resources on the unlicensed spectrum while ensuring the delay and performance of the entire communication link.

BRIEF DESCRIPTION OF THE DRAWINGS

The drawings described herein are used to provide a further understanding of the present disclosure and constitute a part of the present disclosure. The schematic embodiments of the present disclosure and their descriptions are used to explain the present disclosure and do not constitute an undue limitation on the present disclosure. In the drawings.

DETAILED DESCRIPTION

To facilitate understanding of the technical solutions of the embodiments of the present disclosure, the following describes related technologies involved in the embodiments of the present disclosure.

1) Unlicensed Spectrum

The unlicensed spectrum is a spectrum allocated by countries and regions that can be used for communication of the radio equipment. Such spectrum is generally considered to be a shared spectrum, that is, communication devices in different communication systems can use this spectrum as long as they meet the regulatory requirements set by the country or region on the spectrum, without applying for a proprietary spectrum license from the government. In order to allow various communication systems that use the unlicensed spectrum for wireless communication to coexist amicably on this spectrum, some countries or regions have stipulated the regulatory requirements that must be met when using the unlicensed spectrum. For example, in Europe, the communication devices follow the principle of Listen Before Talk (LBT), that is, the communication device needs to perform channel interception before sending signals on the channel of the unlicensed spectrum, and only when the channel interception result is that the channel is idle, the communication device can send signals; and if the channel interception result of the communication device on the channel of the unlicensed spectrum is that the channel is busy, the communication device cannot send signals. In addition, in order to ensure fairness, the duration of signal transmission by the communication device using the channel of the unlicensed spectrum in one transmission cannot exceed the Maximum Channel Occupation Time (MCOT). For another example, in order to avoid causing sub-band interference to the signal transmitted on the channel of the unlicensed spectrum, and to improve the detection accuracy of the communication device when detecting the channel of the unlicensed spectrum, the signal transmitted on the channel of the unlicensed spectrum needs to occupy at least a certain proportion of the channel bandwidth, for example, for 5 GHz band, the signal occupies 80% of the channel bandwidth, and for 60 GHz band, the signal occupies 70% of the channel bandwidth. For another example, in order to avoid that the power of the signal transmitted on the channel of the unlicensed spectrum is too large, which affects the transmission of other important signals on the channel, such as radar signals, the regulations stipulate the maximum power spectral density of the communication device when using the channel of the unlicensed spectrum for signal transmission.

2) Network Architecture

The embodiments of the present disclosure may be applied to various communication systems, such as: a Global System of Mobile communication (GSM) system, a Code Division Multiple Access (CDMA) system, a Wideband Code Division Multiple Access (WCDMA) system, General Packet Radio Service (GPRS), a Universal Mobile Telecommunication System (UMTS), a LTE system, and an evolution system of LTE system, such as an Advanced long term evolution (LTE-A) system, a NR system and an evolution system of the NR system, such as a NR-based access to Unlicensed spectrum (NR-U) system on the unlicensed spectrum, or a next-generation communication system, etc.

Generally speaking, conventional communication systems support a limited number of connections and are easy to implement. However, with the development of communication technologies, the mobile communication systems will not only support conventional communication, but also support, for example, Device-to-Device (D2D) communication, Machine to Machine (M2M) communication, Machine Type Communication (MTC), and Vehicle to Vehicle (V2V) communication.

The communication system in the embodiments of the present disclosure may be applied to a Carrier Aggregation (CA) scenario, a Dual Connectivity (DC) scenario, or a Standalone (SA) networking scenario.

The present disclosure describes various embodiments in combination with the network device and the terminal device.

The terminal device may also be called User Equipment (UE), an access terminal, a subscriber unit, a user station, a mobile station, a mobile platform, a remote station, a remote terminal, a mobile device, a user terminal, a terminal, a wireless communication device, a user agent or a user apparatus. The terminal device may be a station (ST, STAION) in a Wireless Local Area Networks (WLAN), may be a cellular phone, a cordless phone, a Session Initiation Protocol (SIP) phone, or a Wireless Local Loop (WLL) station, a Personal Digital Assistant (PDA) device, a handheld device with wireless communication capabilities, a computing device or other processing devices connected to wireless modems, an in-vehicle device, a wearable device, and a next-generation communication system, for example, a terminal device in a fifth-generation (5G) network or a terminal device in a future evolved Public Land Mobile Network (PLMN).

By way of example and not limitation, in the embodiments of the present disclosure, the terminal device may also be a wearable device. The wearable device may also be referred to as a wearable smart device, which is a general term for devices capable of being worn that are intelligently designed and developed based on daily worn devices by applying wearable technology, such as glasses, gloves, watches, clothing and shoes. The wearable device is a portable device that is worn directly on the body or integrated into the user's clothes or accessories. The wearable device is not only a hardware device, but also achieves powerful functions through software support, data interaction, and cloud interaction. Generalized wearable smart devices include: devices that have numerous functions, large sizes, and complete or partial functions thereof do not rely on the smartphone, such as smart watches or smart glasses, and devices that only focus on a certain type of application functions and need to cooperate with other devices such as the smartphones, such as various smart bracelets and smart jewelry for sign monitoring.

The network device may be a device for communicating with a mobile device, and the network device may be an Access Point (AP) in WLAN, a base station (Base Transceiver Station, BTS) in GSM or CDMA, or a base station (NodeB, NB) in WCDMA, or may be an evolved base station (Evolutional Node B, eNB or eNodeB) in LTE, or a relay station or an access point, or a vehicle-mounted device, a wearable device, a network device in the NR network, or a network device in a future evolved PLMN network.

In the embodiments of the present disclosure, the network device provides services for the cell, and the terminal device communicates with the network device through the transmission resources (for example, frequency domain resources, or spectrum resources) used by the cell. The cell may be a cell corresponding to the network device (for example, the base station). The cell may belong to a macro base station or a base station corresponding to a small cell. The small cell here may include: a Metro cell, a Micro cell, a Pico cell, a Femto cells, etc. These small cells have the characteristics of small coverage and low transmit power, and are suitable for providing high-speed data transmission services.

In the embodiments of the present disclosure, a plurality of cells may work at the same frequency on the carriers in the LTE system or the NR system at the same time. In some special scenarios, the above concepts of the carrier and the cell may be considered equivalent. For example, in a CA scenario, when a secondary carrier is configured for a UE, a carrier index of the secondary carrier and a Cell Indentify (Cell ID) of the secondary cell working on the secondary carrier are carried at the same time. In this case, it can be considered that the concepts of the carrier and the cell are the same. For example, a UE accessing a carrier is equivalent to the UE accessing a cell.

It should be noted that the Physical Uplink Control Channel (PUCCH) in the embodiments of the present disclosure may be a PUCCH in the LTE system, or may be a PUCCH in the NR system, or may be an uplink control channel in other systems, which is not limited by the present disclosure.

In the embodiments of the present disclosure, the uplink control information may include at least one of Hybrid Automatic Repeat ReQuest (HARQ) information, Channel-State Information (CSI), Schedule Request (SR) information, and other control information sent by the UE. The CSI information includes at least one of Rank Indicator (RI) information, Precoding Matrix Indicator (PMI) information, and Channel Quality Indicator (CQI) information.

In the embodiments of the present disclosure, the uplink control information may be transmitted through PUCCH or may be transmitted through a Physical Uplink Shared Channel (PUSCH), which is not limited in the present disclosure.

Optionally, in the embodiments of the present disclosure, one downlink transmission opportunity may be defined as one or more consecutive time units used for transmitting downlink information. Similarly, a single uplink transmission opportunity may be defined as one or more consecutive time units for transmitting uplink information.

In the embodiments of the present disclosure, one time unit may be defined as one or more subframes, or may be defined as one or more time slots, or may be defined as one or more mini-slots or symbols. The starting time unit and/or ending time unit of one downlink transmission opportunity or one uplink transmission opportunity may be a complete time unit, or may be a partial time unit, etc., which is not limited in the embodiments of the present disclosure.

Optionally, one time unit in the present disclosure may refer to a complete time unit or an incomplete time unit. For example, for one uplink time unit, it may mean that all symbols in one time unit are used for uplink transmission, or that some symbols in one time unit are used for uplink transmission, which is not limited in the present disclosure.

The technical solutions of the embodiments of the present disclosure introduce a flexible PDSCH-HARQ feedback time (or timing) in the NR-U system, so as to ensure the delay and performance of the entire communication link.

Figure 2:
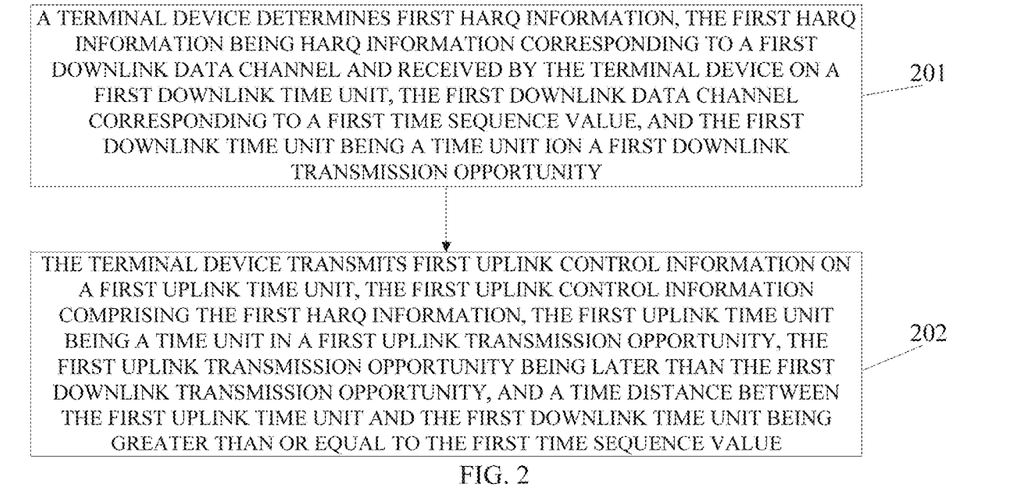
FIG. 2 is a first schematic flowchart of a method for transmitting HARQ information according to an embodiment of the present disclosure.

FIG. 2 is a first schematic flowchart of a method for transmitting HARQ information according to an embodiment of the present disclosure. In the embodiment of the present disclosure, as shown in FIG. 2, the method for transmitting HARQ information includes the following steps.

In step 201, the terminal device determines first HARQ information, where the first HARQ information is HARQ information corresponding to a first downlink data channel received by the terminal device on a first downlink time unit, and the first downlink data channel corresponds to a first timing value (first time sequence value).

Optionally, the first downlink time unit is a time unit in a first downlink transmission opportunity.

Optionally, the first timing value is determined according to a HARQ processing capability of the terminal device.

Optionally, the first timing value is determined according to a priority of the service transmitted on the first downlink data channel.

Optionally, after receiving the first downlink data channel on time unit #n, the terminal device determines the first HARQ information according to a demodulation result of the first downlink data channel, and the terminal device may feed back in the shortest time in the time unit # (n+k) the first HARQ information, where k is the first timing value corresponding to the first downlink data channel.

In step 202, the terminal device transmits first uplink control information on a first uplink time unit, where the first uplink control information includes the first HARQ information, and a time distance between the first uplink time unit and the first downlink time unit is greater than or equal to the first timing value.

Optionally, the first uplink time unit is a time unit in the first uplink transmission opportunity.

Optionally, the first uplink transmission opportunity is later than the first downlink transmission opportunity.

In the embodiments of the present application, the unit of the time distance may be a time unit, and the unit of the timing value may also be a time unit. Taking the time distance as an example, the time distance between time unit #2 and time unit #3 is 1 time unit; and the time distance between time unit #5 and time unit #8 is 3 time units. Taking the timing value as an example, if the HARQ information corresponding to the downlink data channel transmitted on time unit #5 is fed back on time unit #8, then the timing value is 3 time units.

Figure 4:
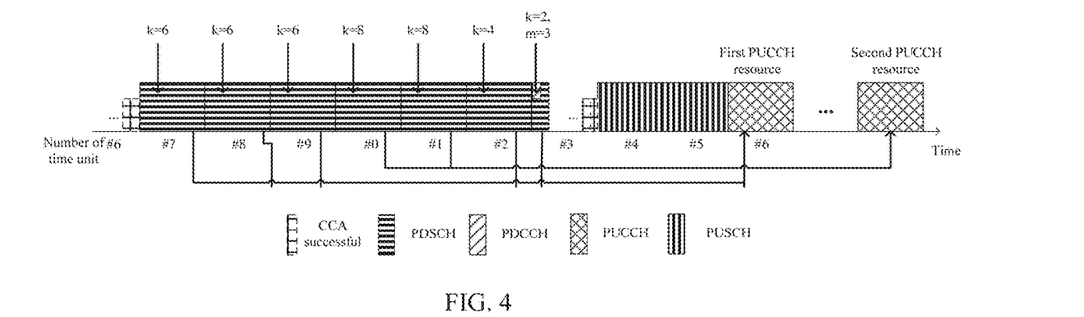
FIG. 4 is a schematic diagram of the time domain of PDSCH-HARQ feedback according to an embodiment of the present disclosure.

Referring to FIG. 4, the timing value corresponding to PDSCH is denoted as k. For example, the first timing value k corresponding to the PDSCH on time unit #7 is k=6.

In an embodiment, the terminal device receives first information on a second downlink time unit, the first information is used to determine a second timing value, and the second timing value is a time distance between the first uplink time unit and a reference time units, where the reference time unit and the second downlink time unit are the same time unit; or, the reference time unit is the last downlink time unit in the first downlink transmission opportunity; or, the reference time unit is the first one of the uplink time units in the first uplink transmission opportunity.

Referring to FIG. 4, the terminal device receives the PDCCH on time unit #3, and the PDCCH includes first information used to determine a second timing value m (where m=3), and the location of the PUCCH (i.e., the first uplink time unit) may be determined through the value of m and the reference time unit. For example, the reference time unit is the same time unit as the second downlink time unit or the reference time unit is the last downlink time unit in the first downlink transmission opportunity according to the above solutions. It should be understood that if the reference time unit is the first one of the uplink time units in the first uplink transmission opportunity according to the above solution, then the reference time unit is time unit #4 in FIG. 4, and the second timing value m=2.

In one embodiment, the difference between the first timing value (such as the k value in FIG. 4) and the second timing value (such as the m value in FIG. 4) is a first value, and when the time distance between the first uplink time unit and the first downlink time unit is greater than or equal to the first timing value, the time distance between the first downlink time unit and the reference time unit is greater than or equal to the first value.

In an embodiment, the first timing value is determined by scheduling first downlink control information transmitted by the first downlink data channel. That is, when scheduling the first downlink data channel for transmission through the first downlink control information, the first timing value corresponding to the first downlink data channel is indicated in the first downlink control information.

It should be understood that the first downlink control information and the first downlink data channel may be on the same time unit or may be on different time units, which is not limited in the present disclosure.

In an embodiment, the first uplink control information further includes second HARQ information, where the second HARQ information is HARQ information corresponding to a second downlink data channel received by the terminal device on a third downlink time unit, the second downlink data channel corresponds to a third timing value, the third downlink time unit is a time unit in the first downlink transmission opportunity; and a time distance between the first uplink time unit and the third downlink time unit is greater than or equal to the third timing value.

Referring to FIG. 4, each PDSCH corresponds to one timing value k. For example: the first timing value k corresponding to the PDSCH on time unit #7 (i.e., the first downlink time unit) is k=6, and the corresponding HARQ information is the first HARQ information; and the third timing value k corresponding to the PDSCH on time unit #2 (i.e., the third downlink time unit) is k=4, and the corresponding HARQ information is the second HARQ information. Both the first HARQ information and the second HARQ information are transmitted through the PUCCH on time unit #6 (i.e., the first uplink time unit). It should be understood that the first HARQ information and the second HARQ information may also be transmitted through PUSCH, which is not limited in the present disclosure.

Here, the first uplink control information may include at least two HARQ information. Referring to FIG. 4, the number of the time unit is numbered from #0 to #9 in a cyclic way, and one downlink transmission on the unlicensed spectrum includes 7 time units. Among them, the time unit where the PDSCH is located includes time unit #7, time unit #8, time unit #9, time unit #0, time unit #1, time unit #2, and part of the time unit #3. In addition, PUCCH (that is, the first PUCCH) is located in time unit #6, where the timing value corresponding to PDSCH on time unit #7 is k=6, the timing value corresponding to PDSCH on time unit #8 is k=6, the timing value corresponding to PDSCH on time unit #9 is k=6, the timing value corresponding to PDSCH on time unit #0 is k=8, the timing value corresponding to PDSCH on time unit #1 is k=8, the timing value corresponding to PDSCH on time unit #2 is k=4, and the timing value corresponding to PDSCH on time unit #3 is k=2. It can be seen that: the time unit satisfying that 1) the time distance between the first uplink time unit and the first downlink time unit is greater than or equal to the first timing value, or 2) the time distance between the first downlink time unit and the reference time unit is greater than or equal to the first value, includes: time unit #7, time unit #8, time unit #9, time unit #2, and time unit #3, accordingly, PUCCH on time unit #6 may transmit the HARQ corresponding to the PDSCH on time unit #7, time unit #8, time unit #9, time unit #2, and time unit #3.

In an embodiment, the terminal device transmits the first uplink control information on a second uplink time unit, and the second uplink time unit is later than the first uplink time unit. Here, the first uplink control information may be repeatedly transmitted on multiple uplink time units. If the transmission of the first uplink control information on the first uplink time unit fails, the first uplink control information is repeatedly transmitted on the second uplink time unit after the first uplink time unit, which can improve the sending probability of the first uplink control information.

In an embodiment, the second uplink time unit is a time unit in the first uplink transmission opportunity; or, the second uplink time unit is a time unit in the second uplink transmission opportunity. That is, the resource used for the repeated transmission of the first uplink control information may be in the same uplink transmission opportunity as the resource used for the first transmission of the first uplink control information, or may be in a different uplink transmission opportunity as the resource used for the first transmission of the first uplink control information.

In an embodiment of the present application, the terminal device determines third HARQ information, the third HARQ information is HARQ information corresponding to a third downlink data channel received by the terminal device on a fourth downlink time unit, the third The downlink data channel corresponds to a fourth timing value, the fourth downlink time unit is a time unit in the first downlink transmission opportunity, and the time distance between the fourth downlink time unit and the reference time unit is less than the first value.

The terminal device transmits second uplink control information on a third uplink time unit, the second uplink control information includes the third HARQ information, and the time distance between the third uplink time unit and the fourth downlink time unit is greater than or equal to the fourth timing value.

That is, for the HARQ information fed back on the first uplink time unit that does not satisfy the feedback condition, it is possible to feed back the HARQ information on the third uplink time unit (another time unit that may be used for feeding back the uplink HARQ information after the first uplink time unit) after the feedback condition is satisfied.

In an embodiment, the third uplink time unit is a time unit in the first uplink transmission opportunity; or, the third uplink time unit is a time unit in the third uplink transmission opportunity. That is, the third uplink time unit may be in the same uplink transmission opportunity as the first uplink time unit, or may be in a different uplink transmission opportunity from that of the first uplink time unit.

Referring to FIG. 4, the time unit is numbered #0~#9 in a cyclic way, and one downlink transmission on the unlicensed spectrum includes 7 time units, and the time unit where the PDSCH is located includes time unit #7, time unit #8, time unit #9, time unit #0, time unit #1, time unit #2, and part of the time unit #3. In addition, the first PUCCH resource is located in time unit #6, and the second PUCCH resource is located after the first PUCCH resource. The timing value corresponding to the PDSCH on time unit #7 is k=6, the timing value corresponding to the PDSCH on time unit #8 is k=6, the timing value corresponding to the PDSCH on time unit #9 is k=6, the timing value corresponding to the PDSCH on time unit #0 is k=8, the timing value corresponding to the PDSCH on time unit #1 is k=8, the timing value corresponding to the PDSCH on time unit #2 is k=4, and the timing value corresponding to the PDSCH on time unit #3 is k=2. It can be seen that the time unit not satisfying that 1) the time distance between the first uplink time unit and the first downlink time unit is greater than or equal to the first timing value, or 2) the time distance between the first downlink time unit and the reference time unit is greater than or equal to the first value, includes: time unit #0, time unit #1. As a result, the PUCCH (the first PUCCH) on unit #6 cannot transmit the HARQ corresponding to the PDSCH on time unit #0 and time unit #1, and the second PUCCH resource is required to transmit the HARQ corresponding to PDSCH on time unit #0 and time unit #1, and the time unit where the second PUCCH is located (that is, the third uplink time unit) needs to satisfy: a time distance between the third uplink time unit and the fourth downlink time unit (that is, time unit #0 and time unit #1) is greater than or equal to the fourth timing value (that is, k=8 corresponding to PDSCH on time unit #0 and k=8 corresponding to PDSCH on time unit #1).

Using the technical solutions of the embodiments of the present disclosure, when the uplink control information is fed back on the unlicensed carrier, by flexibly feeding back the HARQ information corresponding to the PDSCH on one or more time units that satisfy the PDSCH-HARQ feedback time on the time unit where the PUCCH used to transmit the uplink control information is located, the network device can flexibly and effectively allocate the uplink and downlink resources on the unlicensed spectrum while ensuring the delay and performance of the entire communication link.

Figure 3:
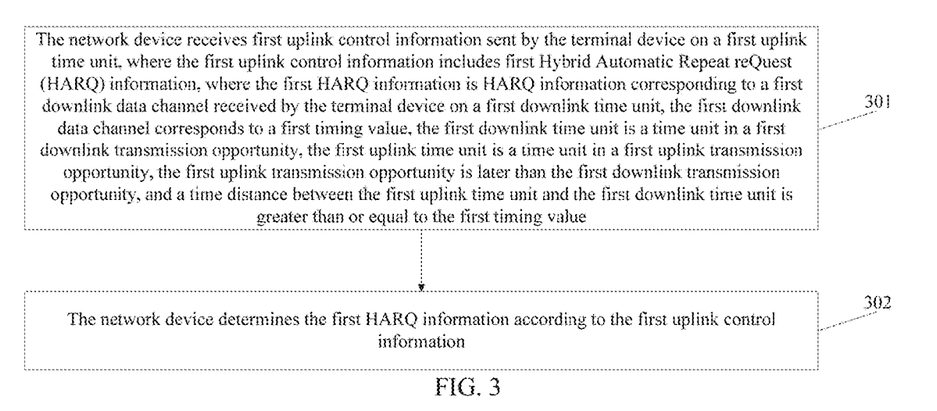
FIG. 3 is a second schematic flowchart of a method for transmitting HARQ information according to an embodiment of the present disclosure.

FIG. 3 is a second schematic flowchart of a method for transmitting HARQ information according to an embodiment of the present disclosure. In the embodiment of the present disclosure, as shown in FIG. 3, the method for transmitting HARQ information includes the following steps.

In step 301: the network device receives first uplink control information sent by the terminal device on a first uplink time unit, where the first uplink control information includes first Hybrid Automatic Repeat reQuest (HARQ) information, where the first HARQ information is HARQ information corresponding to a first downlink data channel received by the terminal device on a first downlink time unit, the first downlink data channel corresponds to a first timing value, and a time distance between the first uplink time unit and the first downlink time unit is greater than or equal to the first timing value.

Optionally, the first downlink time unit is a time unit in a first downlink transmission opportunity, the first uplink time unit is a time unit in a first uplink transmission opportunity, and the first uplink transmission opportunity is later than the first downlink transmission opportunity.

In step 302: the network device determines the first HARQ information according to the first uplink control information.

In an embodiment, the network device sends first information on a second downlink time unit, the first information is used by the terminal device to determine a second timing value, and the second timing value is the time distance between the first uplink time unit and a reference time unit, where, the reference time unit and the second downlink time unit are the same time unit; or, the reference time unit is the last downlink time unit in the first downlink transmission opportunity; or, the reference time unit is the first one of uplink time units in the first uplink transmission opportunity.

In an embodiment, a difference between the first timing value and the second timing value is a first value, and the time distance between the first downlink time unit and the reference time unit is greater than or equal to the first value.

In an embodiment, the network device sends first downlink control information, the first downlink control information is used to schedule the first downlink data channel, and the first downlink control information is also used by the terminal device to determine the first timing value.

In an embodiment, the first uplink control information further includes second HARQ information, the second HARQ information is HARQ information corresponding to a second downlink data channel received by the terminal device on a third downlink time unit, the second downlink data channel corresponds to a third timing value, the third downlink time unit is a time unit in the first downlink transmission opportunity; and the time distance between the first uplink time unit and the third downlink time unit is greater than or equal to the third timing value.

The network device determines the second HARQ information according to the first uplink control information.

In an embodiment, the network device receives the first uplink control information sent by the terminal device on a second uplink time unit, and the second uplink time unit is later than the first uplink time unit.

In an embodiment, the second uplink time unit is a time unit in the first uplink transmission opportunity; or, the second uplink time unit is a time unit in a second uplink transmission opportunity.

In an embodiment, the method further includes:

the network device receiving, on a third uplink time unit, second uplink control information sent by the terminal device, where the second uplink control information includes third HARQ information, where the third HARQ information is HARQ information corresponding to a third downlink data channel received by the terminal device on a fourth downlink time unit, where the third downlink data channel corresponds to a fourth timing value, the fourth downlink time unit is a time unit in the first downlink transmission opportunity, the time distance between the fourth downlink time unit and the reference time unit is less than the first value, and the time distance between the third uplink time unit and the fourth downlink time unit is greater than or equal to the fourth timing value.

The network device determines the third HARQ information according to the second uplink control information.

In an embodiment, the third uplink time unit is a time unit in the first uplink transmission opportunity; or, the third uplink time unit is a time unit in a third uplink transmission opportunity.

Those skilled in the art should understand that the embodiments on the network device side of the present disclosure can be understood with reference to the embodiments on the terminal device side. The information feedback method on the network device side and the information feedback method on the terminal device have corresponding processes and effects.

Figure 5:
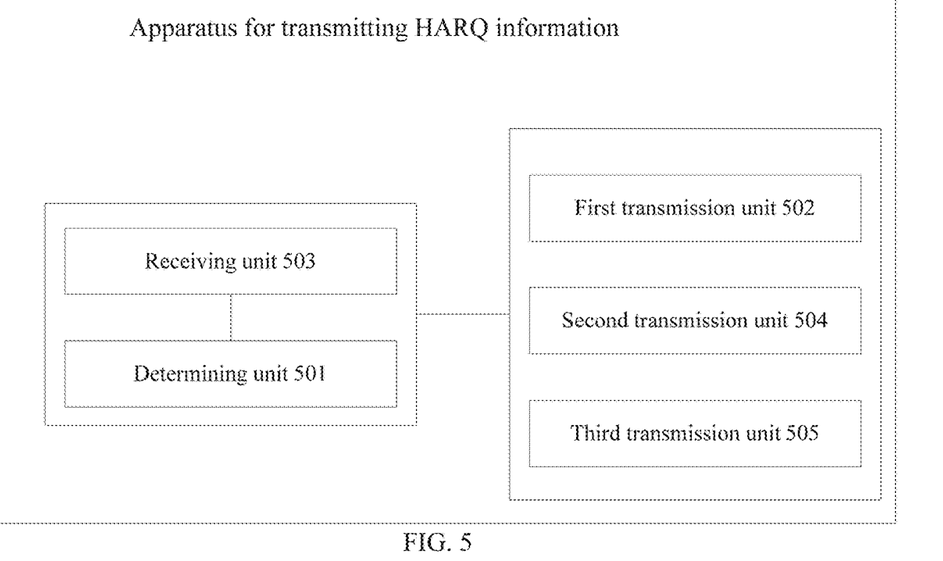
FIG. 5 is a first schematic structural diagram of an apparatus for transmitting HARQ information according to an embodiment of the present disclosure.

FIG. 5 is a first schematic structural diagram of an apparatus for transmitting HARQ information according to an embodiment of the present disclosure. In the embodiment of the present disclosure, as shown in FIG. 5, the apparatus for transmitting HARQ information includes:

a determining unit 501, configured to determine first Hybrid Automatic Repeat reQuest (HARQ) information, where the first HARQ information is HARQ information corresponding to the first downlink data channel received by the terminal device on the first downlink time unit, and the first downlink data channel corresponds to a first timing value; and a first transmission unit 502, configured to transmit first uplink control information on a first uplink time unit, where the first uplink control information includes the first HARQ information, where a time distance between the first uplink time unit and the first downlink time unit is greater than or equal to the first timing value.

Optionally, the first downlink time unit is a time unit in a first downlink transmission opportunity, the first uplink time unit is a time unit in a first uplink transmission opportunity, and the first uplink transmission opportunity is later than the first downlink transmission opportunity.

In an embodiment, the apparatus further includes:

a receiving unit 503, configured to receive first information on a second downlink time unit, where the first information is used to determine a second timing value, and the second timing value is a time distance between the first uplink time unit and a reference time unit, where the reference time unit and the second downlink time unit are the same time unit; or, the reference time unit is the last downlink time unit in the first downlink transmission opportunity; or, the reference time unit is the first one of uplink time units in the first uplink transmission opportunity.

In an embodiment, a difference between the first time sequence value and the second time sequence value is a first value, and the time distance between the first downlink time unit and the reference time unit is greater than or equal to the first value.

In an embodiment, the first timing value is determined by scheduling first downlink control information transmitted by the first downlink data channel.

In an embodiment, the first uplink control information further includes second HARQ information, the second HARQ information is HARQ information corresponding to a second downlink data channel received by the terminal device on a third downlink time unit, the second downlink data channel corresponds to a third timing value, the third downlink time unit is a time unit in the first downlink transmission opportunity; and a time distance between the first uplink time unit and the third downlink time unit is greater than or equal to the third timing value.

In an embodiment, the apparatus further includes:

a second transmission unit 504, configured to transmit the first uplink control information on a second uplink time unit, where the second uplink time unit is later than the first uplink time unit.

In an embodiment, the second uplink time unit is a time unit in the first uplink transmission opportunity; or, the second uplink time unit is a time unit in a second uplink transmission opportunity.

In an embodiment, the determining unit 501 is further configured to determine third HARQ information, the third HARQ information is HARQ information corresponding to a third downlink data channel received by the terminal device on a fourth downlink time unit, the third downlink data channel corresponds to a fourth timing value, the fourth downlink time unit is a time unit in the first downlink transmission opportunity, and a time distance between the fourth downlink time unit and the reference time unit is less than the first value.

The apparatus further includes: a third transmission unit 505, configured to transmit second uplink control information on a third uplink time unit, the second uplink control information includes the third HARQ information, and the time distance between the third uplink time unit and the fourth downlink time unit is greater than or equal to the fourth timing value.

In an embodiment, the third uplink time unit is a time unit in the first uplink transmission opportunity; or, the third uplink time unit is a time unit in a third uplink transmission opportunity.

Those skilled in the art should understand that the implementation function of each unit in the apparatus for transmitting HARQ information shown in FIG. 5 can be understood by referring to the foregoing related description of the method for transmitting HARQ information. The function of each unit in the apparatus for transmitting HARQ information shown in FIG. 5 may be realized by a program running on a processor, or may be realized by a specific logic circuit. It should also be understood that the first transmission unit 502, the second transmission unit 504, and the third transmission unit 505 shown in FIG. 5 may be the same transmission unit or different transmission units, and the present disclosure is not limited thereto.

Figure 6:
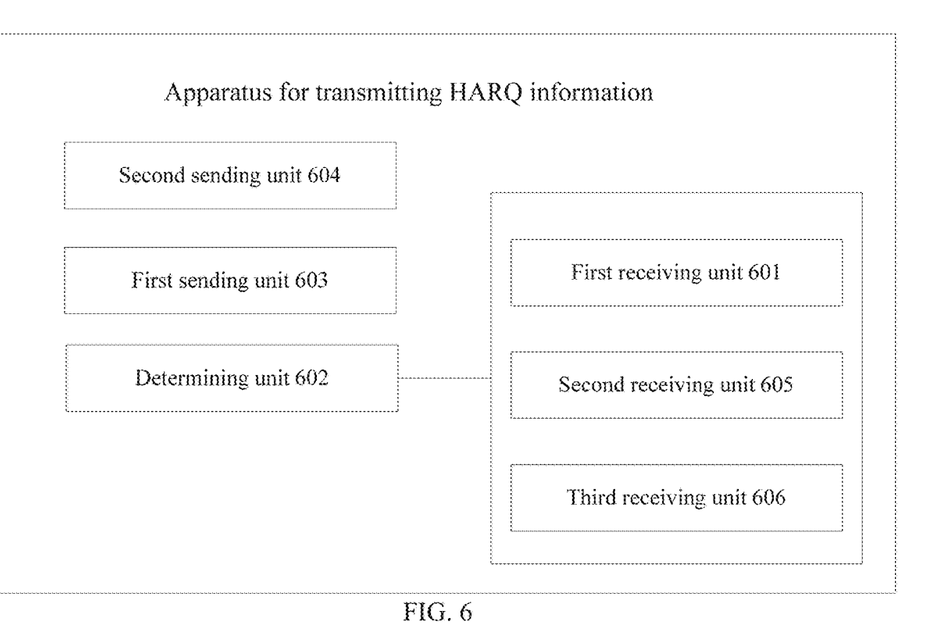
FIG. 6 is a second schematic structural diagram of an apparatus for transmitting HARQ information according to an embodiment of the present disclosure.

FIG. 6 is a second structural composition diagram of an apparatus for transmitting HARQ information according to an embodiment of the present disclosure. In the embodiment of the present disclosure, as shown in FIG. 6, the apparatus for transmitting HARQ information includes:

a first receiving unit 601, configured to receive first uplink control information sent by a terminal device on a first uplink time unit, where the first uplink control information includes first Hybrid Automatic Repeat reQuest (HARQ) information, where the first HARQ information is HARQ information corresponding to the first downlink data channel received by the terminal device on the first downlink time unit, the first downlink data channel corresponds to a first timing value, and a time distance between the first uplink time unit and the first downlink time unit is greater than or equal to the first timing value; and a determining unit 602, configured to determine the first HARQ information according to the first uplink control information.

Optionally, the first downlink time unit is a time unit in a first downlink transmission opportunity, the first uplink time unit is a time unit in a first uplink transmission opportunity, and the first uplink transmission opportunity is later that the first downlink transmission opportunity.

In an embodiment, the apparatus further includes:

a first sending unit 603, configured to send first information on a second downlink time unit, where the first information is used by the terminal device to determine a second timing value, and the second timing value is a time distance between the first uplink time unit and the reference time unit, where, the reference time unit and the second downlink time unit are the same time unit; or, the reference time unit is the last downlink time unit in the first downlink transmission opportunity; or, the reference time unit is the first one of uplink time units in the first uplink transmission opportunity.

In an embodiment, the difference between the first timing value and the second timing value is a first value, and the time distance between the first downlink time unit and the reference time unit is greater than or equal to the first value.

In an embodiment, the apparatus further includes:

a second sending unit 604, configured to send first downlink control information, where the first downlink control information is used to schedule the first downlink data channel, and the first downlink control information is also used for the terminal device to determine the first timing value.

In an embodiment, the first uplink control information further includes second HARQ information, the second HARQ information is HARQ information corresponding to a second downlink data channel received by the terminal device on a third downlink time unit, the second downlink data channel corresponds to a third timing value, the third downlink time unit is a time unit in the first downlink transmission opportunity; and a time distance between the first uplink time unit and the third downlink time unit is greater than or equal to the third timing value; and the determining unit 602 is further configured to determine the second HARQ information according to the first uplink control information.

In an embodiment, the apparatus further includes:

a second receiving unit 605, configured to receive the first uplink control information sent by the terminal device on a second uplink time unit, where the second uplink time unit is later than the first uplink time unit.

In an embodiment, the second uplink time unit is a time unit in the first uplink transmission opportunity; or, the second uplink time unit is a time unit in a second uplink transmission opportunity.

In an embodiment, the apparatus further includes:

a third receiving unit 606, configured to receive, on a third uplink time unit, second uplink control information sent by the terminal device, where the second uplink control information includes third HARQ information, where the third HARQ information is HARQ information corresponding to a third downlink data channel received by the terminal device on a fourth downlink time unit, the third downlink data channel corresponds to a fourth timing value, the fourth downlink time unit is a time unit in the first downlink transmission opportunity, the time distance between the fourth downlink time unit and the reference time unit is less than the first value, and the time distance between the third uplink time unit and the fourth downlink time unit is greater than or equal to the fourth timing value; and the determining unit 602 is further configured to determine the third HARQ information according to the second uplink control information.

In an embodiment, the third uplink time unit is a time unit in the first uplink transmission opportunity; or, the third uplink time unit is a time unit in a third uplink transmission opportunity.

Those skilled in the art should understand that the implementation function of each unit in the apparatus for transmitting HARQ information shown in FIG. 6 can be understood by referring to the foregoing related description of the method for transmitting HARQ information. The function of each unit in the apparatus for transmitting HARQ information shown in FIG. 6 may be realized by a program running on a processor, or may be realized by a specific logic circuit. It should also be understood that the first receiving unit 601, the second receiving unit 605, and the third receiving unit 606 shown in FIG. 6 may be the same receiving unit, or may be different receiving units; and the first sending unit 603 and the second sending unit 604 shown in FIG. 6 may be the same sending unit, or may be different sending units; which are not limited by the present disclosure.

In the embodiments of the present disclosure, if the above apparatus for transmitting HARQ information is implemented in the form of a software function module and sold or used as an independent product, it may also be stored in a computer-readable storage medium. Based on this understanding, the essence of the technical solutions of the present disclosure, or the part contributing to the related art, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk, or an optical disk. In this way, the embodiments of the present disclosure are not limited to any specific combination of hardware and software.

Correspondingly, an embodiment of the present disclosure also provides a computer storage medium in which computer-executable instructions are stored. When the computer-executable instructions are executed by a processor, the above-described method for transmitting HARQ information according to the embodiment of the present disclosure is implemented.

Figure 7:
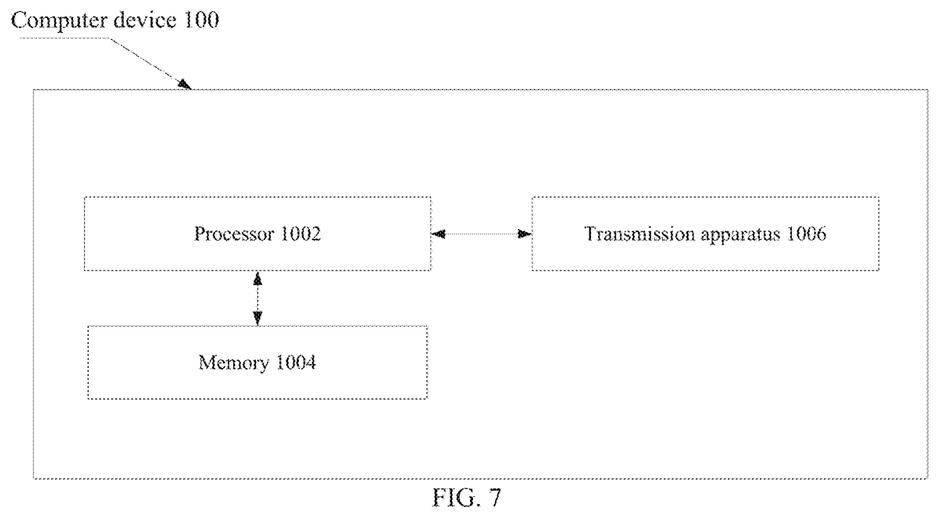
FIG. 7 is a schematic structural diagram of a computer device according to an embodiment of the present disclosure.

FIG. 7 is a schematic structural diagram of a computer device according to an embodiment of the present disclosure. The computer device may be a terminal device or a network device. As shown in FIG. 7, the computer device 100 may include one or more (only one is shown in the drawings) processor 1002 (the processor 1002 may include but not limited to processing apparatuses such as a Micro Controller Unit (MCU) or a Field Programmable Gate Array (FPGA)), a memory 1004 for storing data, and a transmission apparatus 1006 for a communication function. A person of ordinary skill in the art may understand that the structure shown in FIG. 7 is merely an illustration, which does not limit the structure of the above electronic apparatus. For example, the computer device 100 may also include more or fewer components than those shown in FIG. 7, or have a different configuration than that shown in FIG. 7.

The memory 1004 may be used to store software programs and modules of application software, such as program instructions/modules corresponding to the methods in the embodiments of the present disclosure. The processor 1002 executes various functional applications and data processing by running the software programs and modules stored in the memory 1004, that is, to achieve the above method. The memory 1004 may include a high-speed random access memory, and may further include a non-volatile memory, such as one or more magnetic storage devices, flash memory, or other non-volatile solid-state memory. In some examples, the memory 1004 may further include memories remotely provided with respect to the processor 1002, and these remote memories may be connected to the computer device 100 through a network. Examples of the aforementioned network include, but are not limited to, the Internet, intranet, local area network, mobile communication network, and combinations thereof.

The transmission device 1006 is used to receive or send data via a network. The specific example of the network described above may include a wireless network provided by a communication provider of the computer device 100. In one example, the transmission device 1006 includes a network adapter (Network Interface Controller, NIC), which may be connected to other network devices through the base station to communicate with the Internet. In one example, the transmission device 1006 may be a Radio Frequency (RF) module, which is used to communicate with the Internet in a wireless manner.

The technical solutions described in the embodiments of the present disclosure may be arbitrarily combined if there is no confliction.

In the several embodiments provided by the present disclosure, it should be understood that the disclosed method and smart device may be implemented in other ways. The device embodiments described above are only schematic. For example, the division of the units is only a division of logical functions. In actual implementation, there may be other division methods, such as: multiple units or components may be combined, or may be integrated into another system, or some features may be ignored, or not implemented. In addition, the displayed or discussed mutual coupling or direct coupling or communication connection between individual components may be indirect coupling or communication connection through some interfaces, devices or units, which may be electrical, mechanical or other forms.

The units described as separate components may or may not be physically separated, and the components displayed as units may or may not be physical units, may be located in one place, or may be distributed on a plurality of network units. Some or all of the units may be selected according to actual needs to achieve the objective of the solution of this embodiment.

In addition, the functional units in the embodiments of the present disclosure may all be integrated into one second processing unit, or each unit may be separately used as a unit, or two or more units may be integrated into one unit; and the above integrated unit may be implemented in the form of hardware, or in the form of hardware plus software functional units.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A method for transmitting Hybrid Automatic Repeat reQuest (HARQ) information, comprising:
   determining, by a terminal device, first Hybrid Automatic Repeat reQuest (HARQ) information, wherein the first HARQ information is HARQ information corresponding to a first downlink data channel received by the terminal device on a first downlink time unit, the first downlink data channel corresponds to a first timing value, and the first downlink time unit is a time unit in a first downlink transmission opportunity;
   receiving, by the terminal device, first information on a second downlink time unit, wherein the first information is used to determine a second timing value, and the second timing value is a time distance between a first uplink time unit and the second downlink time unit and
   transmitting, by the terminal device, first uplink control information on the first uplink time unit, wherein the first uplink control information comprises the first HARQ information, wherein the first uplink time unit is a time unit in a first uplink transmission opportunity, the first uplink transmission opportunity is later than the first downlink transmission opportunity, and a time distance between the first uplink time unit and the first downlink time unit is greater than or equal to the first timing value.

2. The method according to claim 1, wherein a difference between the first timing value and the second timing value is a first value, and a time distance between the first downlink time unit and the second downlink time unit is greater than or equal to the first value.

3. The method according to claim 1, wherein the first timing value is determined by scheduling first downlink control information transmitted by the first downlink data channel.

4. The method according to claim 1, wherein the first uplink control information further comprises second HARQ information, wherein the second HARQ information is HARQ information corresponding to a second downlink data channel received by the terminal device on a third downlink time unit, the second downlink data channel corresponds to a third timing value, and the third downlink time unit is a time unit in the first downlink transmission opportunity; and a time distance between the first uplink time unit and the third downlink time unit is greater than or equal to the third timing value.

5. The method according to claim 1, further comprising:
   transmitting, by the terminal device, the first uplink control information on a second uplink time unit, wherein the second uplink time unit is later than the first uplink time unit.

6. The method according to claim 5, wherein the second uplink time unit is a time unit in the first uplink transmission opportunity; or,
   the second uplink time unit is a time unit in a second uplink transmission opportunity.

7. The method according to claim 2, further comprising:
   determining, by the terminal device, third HARQ information, wherein the third HARQ information is HARQ information corresponding to a third downlink data channel received by the terminal device on a fourth downlink time unit, the third downlink data channel corresponds to a fourth timing value, the fourth downlink time unit is a time unit in the first downlink transmission opportunity, and a time distance between the fourth downlink time unit and the second downlink time unit is less than the first value; and
   transmitting, by the terminal device, second uplink control information on a third uplink time unit, wherein the second uplink control information comprises the third HARQ information, and a time distance between the third uplink time unit and the fourth downlink time unit is greater than or equal to the fourth timing value.

8. The method according to claim 7, wherein the third uplink time unit is a time unit in the first uplink transmission opportunity; or, the third uplink time unit is a time unit in a third uplink transmission opportunity.

9. An apparatus for transmitting Hybrid Automatic Repeat reQuest (HARQ) information, comprising:

a processor; and a memory for storing instructions executable by the processor;

wherein the processor is configured to:

determine first Hybrid Automatic Repeat reQuest (HARQ) information, wherein the first HARQ information is HARQ information corresponding to a first downlink data channel received on a first downlink time unit, the first downlink data channel corresponds to a first timing value, and the first downlink time unit is a time unit in a first downlink transmission opportunity;

receive first information on a second downlink time unit, wherein the first information is used to determine a second timing value, and the second timing value is a time distance between a first uplink time unit and the second downlink time unit and transmit first uplink control information on a first uplink time unit, wherein the first uplink control information comprises the first HARQ information, wherein the first uplink time unit is a time unit in a first uplink transmission opportunity, the first uplink transmission opportunity is later than the first downlink transmission opportunity, and a time distance between the first uplink time unit and the first downlink time unit is greater than or equal to the first timing value.

10. The apparatus according to claim 9, wherein a difference between the first timing value and the second timing value is a first value, and a time distance between the first downlink time unit and the second downlink time unit is greater than or equal to the first value.

11. The apparatus according to claim 9, wherein the first timing value is determined by scheduling first downlink control information transmitted by the first downlink data channel.

12. The apparatus according to claim 9, wherein the first uplink control information further comprises second HARQ information, wherein the second HARQ information is HARQ information corresponding to a second downlink data channel received by the terminal device on a third downlink time unit, the second downlink data channel corresponds to a third timing value, and the third downlink time unit is a time unit in the first downlink transmission opportunity; and a time distance between the first uplink time unit and the third downlink time unit is greater than or equal to the third timing value.

13. The apparatus according to claim 9, wherein the processor is further configured to:

transmit the first uplink control information on a second uplink time unit, wherein the second uplink time unit is later than the first uplink time unit.

14. The apparatus according to claim 13, wherein the second uplink time unit is a time unit in the first uplink transmission opportunity; or, the second uplink time unit is a time unit in a second uplink transmission opportunity.

15. The apparatus according to claim 10, wherein the processor is further configured to determine third HARQ information, wherein the third HARQ information is HARQ information corresponding to a third downlink data channel received by the terminal device on a fourth downlink time unit, the third downlink data channel corresponds to a fourth timing value, the fourth downlink time unit is a time unit in the first downlink transmission opportunity, and a time distance between the fourth downlink time unit and the second downlink time unit is less than the first value; and transmit second uplink control information on a third uplink time unit, wherein the second uplink control information comprises the third HARQ information, and a time distance between the third uplink time unit and the fourth downlink time unit is greater than or equal to the fourth timing value.

16. The apparatus according to claim 15, wherein the third uplink time unit is a time unit in the first uplink transmission opportunity; or, the third uplink time unit is a time unit in a third uplink transmission opportunity.

17. A non-transitory computer readable storage medium on which computer-executable instructions are stored, which when executed by a processor implements the following method:

determining, by a terminal device, first Hybrid Automatic Repeat reQuest (HARQ) information, wherein the first HARQ information is HARQ information corresponding to a first downlink data channel received by the terminal device on a first downlink time unit, the first downlink data channel corresponds to a first timing value, and the first downlink time unit is a time unit in a first downlink transmission opportunity;

receiving, by the terminal device, first information on a second downlink time unit, wherein the first information is used to determine a second timing value, and the second timing value is a time distance between a first uplink time unit and the second downlink time unit and transmitting, by the terminal device, first uplink control information on the first uplink time unit, wherein the first uplink control information comprises the first HARQ information, wherein the first uplink time unit is a time unit in a first uplink transmission opportunity, the first uplink transmission opportunity is later than the first downlink transmission opportunity, and a time distance between the first uplink time unit and the first downlink time unit is greater than or equal to the first timing value.

* * * * *